US007609506B2

(12) United States Patent  
Aguirre (10) Patent No.: US 7,609,506 B2  
(45) Date of Patent: Oct. 27, 2009

(54) MULTIMEDIA PLAYER FOR GRAVE MARKER

(76) Inventor: Sergio E. Aguirre, 848 Brickell Key Dr., #902, Miami, FL (US) 33131-3709

( * ) Notice: Subject to any disclaimer, the term of this patent is extended or adjusted under 35 U.S.C. 154(b) by 432 days.

(21) Appl. No.: 11/308,399

(22) Filed: Mar. 21, 2006

(65) Prior Publication Data

US 2006/0236326 A1  Oct. 19, 2006

Related U.S. Application Data

(60) Provisional application No. 60/594,229, filed on Mar. 21, 2005.

(51) Int. Cl.
*G06F 1/16* (2006.01)
*H05K 5/00* (2006.01)
*H05K 7/00* (2006.01)

(52) U.S. Cl. .................................. 361/679.02; 345/87

(58) Field of Classification Search ................ 361/681, 361/679.02, 679.21; 345/87
See application file for complete search history.

(56) References Cited

U.S. PATENT DOCUMENTS

| 4,169,970 | A | * | 10/1979 | Opiela et al. .................. 369/19 |
| 4,264,962 | A | * | 4/1981 | Kodaira ....................... 361/681 |
| 4,369,498 | A | * | 1/1983 | Schulte ....................... 368/205 |
| 5,404,343 | A | * | 4/1995 | Boggio ........................ 369/19 |
| 5,522,943 | A | * | 6/1996 | Spencer et al. ............... 136/245 |
| 5,732,515 | A | * | 3/1998 | Rodrigues et al. ............. 52/103 |
| 5,936,380 | A | * | 8/1999 | Parrish ....................... 320/101 |
| 6,094,871 | A | * | 8/2000 | Arnold et al. ................. 52/103 |
| 6,340,978 | B1 | | 1/2002 | Mindrum ..................... 345/764 |
| 6,414,663 | B1 | * | 7/2002 | Manross, Jr. ................. 345/87 |
| 6,980,107 | B1 | | 12/2005 | Ziegler ....................... 340/540 |
| 2001/0036354 | A1 | * | 11/2001 | Majors ........................ 386/46 |
| 2004/0085337 | A1 | | 5/2004 | Barrows ...................... 345/717 |
| 2007/0222410 | A1 | * | 9/2007 | Lee ............................. 320/101 |

* cited by examiner

*Primary Examiner*—Jayprakash N Gandhi  
*Assistant Examiner*—Adrian S Wilson  
(74) *Attorney, Agent, or Firm*—Kyle W. Rost (57) ABSTRACT

A multimedia player is used in conjunction with a grave marker to pay tribute to a decedent. A main body portion of the player supports an opaque solar panel portion that also provides a barrier protecting a video screen on the main body portion of the multimedia player from sunlight damage. The solar panel is hinged as a door over the screen and has a wireless interface to a memory card player of the main body portion. The solar panel provides a recharging voltage via the wireless interface to the electronics module to recharge a lithium ion battery that powers the multimedia player. A flash memory reader contains the tribute on a memory card of any format.

4 Claims, 9 Drawing Sheets

MULTIMEDIA PLAYER FOR GRAVE MARKER

CROSS REFERENCE TO RELATED APPLICATIONS

This application claims the benefit of U.S. Provisional Patent Application Ser. No. 60/594,229 filed Mar. 21, 2005, copending.

BACKGROUND OF THE INVENTION

1. Field of the Invention

The invention generally relates to computer graphics processing and selective visual display systems. In another aspect, the invention generally relates to operator interface processing and more specifically to an on-screen video or audio system interface. More specifically, the invention relates to audio and video memorials, grave markers, and tombstones.

2. Description of Prior Art

In progressive development over the past several decades, technology has made mixed video and audio shows commonly available on ever-improved media. In early days, motion picture film provided an integrated presentation of video images synchronized with a sound track. Later, video cameras using videotape enabled almost anyone to record and reproduce his own multi-media presentation. Videocassette recorders provided an inexpensive mechanism to show recordable videotape on home televisions. However, media such as film and videotape tends to be fragile and has a short life. Such media is subject to wear and degeneration due to repeated usage and passage of time. Thus, these media require considerable care and are not well suited for archival recordings.

More recently, digital media has taken over from film and tape as a more robust system for storing images and sound. Inexpensive recordable discs known as compact discs or CDs can carry a presentation of data in digital format. A media player device can reproduce the content of a CD without significant wear to the CD, itself. However, the media player that reproduces the content of the CD remains mechanical in nature and subject to wear and breakage. Like film and videotape, a CD has a limited life due to the passage of time, alone. Recordable discs of higher capacity format, known as digital video discs or DVDs, can carry several times more data than a CD. However, media players for DVDs remain mechanical and subject to breakage; and DVDs remain subject to limited life due to passage of time, alone. Hard disc drives also record audio-video programs and allow their reproduction through electronic systems. However, a motor operates a hard disc drive and, like a CD or DVD player, is subject to mechanical wear and breakage.

Another form of digital media is the memory card or solid-state digital memory chip, which can be programmed to hold digital data and to maintain the data over time without receiving any electrical power. Early memory chips, referred to as programmable-read-only-memory or PROMs, were used chiefly in computers. Another variety could be erased and reprogrammed. These were referred to as EPROMs or erasable-programmable-read-only-memory.

This technology has advanced to the creation of solid-state memory cards that hold a substantial quantity of data, similar to the content of a CD or DVD. Because the memory cards are solid-state, electronic circuitry reads them, eliminating much of the need for mechanical devices to play the media. Several currently available forms of solid-state memory devices are in the form of portable cards or other small wafers. These are known as by a variety of names, including flash memory cards, flash drives, memory sticks, or pen drives. These types of devices employ a popular interface such as USB or Firewire for communicating with a suitable computer or other electronics system for reading data to play back the sounds or images stored on the card. Such devices are quickly and easily loaded with data from a suitable general purpose computer system, are easily erased by computer system, and can be reprogrammed many times, as desired. Thus, the use of removable memory cards to deliver data or presentations is commonly known, and a contemporary general-purpose computer is suitable to play those presentations.

Digital multimedia players have become small, lightweight, and portable, and they require little current with the result that a battery can operate them for a long time. Portable or mobile multimedia players now combine a recorded memory together with reproduction circuitry, a speaker, and a video screen, in a compact package. Portable media players have been adapted to bring video and audio presentations to a large cross-section of society. For example, automobiles commonly are equipped with an entertainment system that can display movies and operate interactive video games. Thus, multimedia players that produce audio and video presentations recorded on a memory device are commonly in use and readily available. Such multimedia players are commonly known to operate from a rechargeable battery, and a 12 volt current is a suitable available source of power. Similarly, commercial airplanes often provide a built-in video screen at every seat so that passengers can be individually entertained. Such devices are so small and convenient that an individual can carry one in a pocket or purse.

Inevitably, the wide availability and increased robustness of digital media has been adapted to the art of grave markers. Many persons desire to honor and remember a departed person by reviewing an archive of his life and times. Depending upon individual circumstances, audio and visual data about a deceased person may be available in considerable quantity. For example, still photographs, home movies, home video tapes, audio tape recordings, and cds or dvds containing any or all of these data are common. The grave marker is an ideal location for such an archive to be made available. A portable media player can be incorporated into a grave marker to allow visitors to view an audio-video presentation relating to the deceased.

Several United States patent applications and patents address an adaptation of multimedia players to grave markers. These adaptations take several different approaches.

Recent published U.S. patent application 2204/0085337 to Barrows discloses an audio-video player in a tombstone configured with various moisture drainage properties. While Barrows considers the simple need for drainage, an exposed electronic device is subject to many more difficulties.

U.S. Pat. No. 6,340,978 to Mindrum discloses a chronologically grouped life story of a decedent, and several display ideas. The life story may be available on a central kiosk for an entire cemetery at a player on the decedent's headstone. Mindrum suggests applying a clear protective cover over the display screen for weather protection. While a such a cover may keep out moisture, the chief element degenerating a screen is sunlight, which is not kept out by a clear cover.

U.S. Pat. No. 6,414,663 to Manross, Jr., proposes a memorial having a sealed display unit mounted in a recess of a gravestone. A door may cover a display screen, and it appears the door also would cover solar cells surrounding the screen, if solar cells are used, at all. If solar cells are used, it appears they would be expected to power the display unit without benefit of an intermediate battery, and such cells would only be exposed to sunlight if the door is open, thus also exposing the display screen.

U.S. Pat. No. 6,980,107 to Ziegler proposes a gravesite audio-video player that is protected by security codes from access by unauthorized persons. It appears the video screen is permanently exposed on the face of a gravestone. A solar cell for powering the audio-video player is physically separated from the audio-video player and mounted separately on a gravestone. Apparently internal wires through the gravestone connect the solar cell to the audio-video player. This arrangement does not protect the display screen from sunlight degradation. Further, forming wire passages and otherwise hollowing areas of a granite stone is difficult, expensive, and often impractical.

As evident, the prior art addresses only limited ways of protecting a gravesite system from weather, aging and damage. The costs and difficulties of working with granite and like stones create an enduring problem for combining a multimedia player into a gravestone. Further, the design and configuration of prior known gravesite systems do not appear to address many practical aspects of protecting, maintaining, and operating a gravesite system.

It would be desirable to have a media player suited for a long and reliable life when installed at a gravesite, such as on a gravestone, mausoleum face, or any other type of memorial. The technical issues facing the workable adaptation of an audio-video player to a gravesite relate to problems of time, exposure, and damage. A suitable solution should address all of these issues.

In addition, it would be desirable for the components of a gravesite multimedia player to be specifically adapted to perform together. Such specific adaptation would support long and reliable performance and provide an absence of inducement for such parts to be taken with hope of using them for any other application.

To achieve the foregoing and other objects and in accordance with the purpose of the present invention, as embodied and broadly described herein, this invention may comprise the following.

SUMMARY OF INVENTION

According to the invention, a multimedia player is suited for playing a predefined audio and video presentation relating to a decedent. The multimedia player includes a housing carrying a memory device that stores the predefined presentation. Suitable multimedia player components are operative communication with the memory device for reading the memory device and playing the presentation. A rechargeable battery is in electrical communication with the multimedia player for operating the player to play the presentation. A display screen is in operative communication with the multimedia player components for receiving and displaying a video portion of the presentation. The player is adapted for use at a grave site by improvements including that the housing carries the display screen on a front face of the housing. A solar panel that is external of the housing is connectable through the housing to the rechargeable battery for supplying current to recharge the battery. A mount carries the solar panel to the housing suitably to allow the solar panel to move between a two selected positions. In a closed position, a back side of the solar panel overlies the display screen and protects the display screen from exposure to light while displaying the active front face of the solar panel for receiving light to generate electricity. In an open position, the display screen is uncovered and thereby permits viewing the screen.

The accompanying drawings, which are incorporated in and form a part of the specification, illustrate preferred embodiments of the present invention, and together with the description, serve to explain the principles of the invention. In the drawings:

BEST MODE FOR CARRYING OUT THE INVENTION

With reference to the drawings, a multimedia player 10 is adapted for use in grave markers 12 of any type. The multimedia player 10 provides a tribute to the decedent. The tribute may include digitized images and sounds that will be displayed in movie or slideshow format. The player 10 is sufficiently thin that it can be mounted on the face of a tombstone, a mausoleum cover, or another type of gravestone, marker, or memorial.

The multimedia player 10 includes a self-contained means for powering its operation. The preferred means is an opaque solar panel 14, shown in FIGS. 5 and 6. Solar power can provide electricity even at gravesites removed from the power grid. A self-contained solar panel is a preferred way to charge an associated battery to power the media player. Extending the public power grid through a cemetery is to be avoided in most situations. Cost factors aside, cemeteries have a continuing need to dig new graves; and the presence of underground electric power lines would lead to needless accidents.

The solar panel serves the additional purpose of protecting the display screen 16 of the media player 10 during periods of nonuse. The solar panel 14 is configured to serve as a door that closes over the front of the main body 18 of the media player. For this purpose, the solar panel 14 may include a supporting plate or backing panel 22, which may carry solar cells of the solar panel. A hinge 22 or other mounting interconnects the solar panel 14 to the main body 18. The interconnection enables the solar panel to close over the display screen 16 with a predetermined alignment. The backing panel 20 carries a first weather seal 24 on its inside face. This seal may be formed of rubber or other resilient material. As best suggested or shown in FIG. 5-9, the seal 24 is compressed between the solar panel and the front face of the main body 18 of the multimedia player, keeping out water and dirt. Significantly, the solar panel 14 protects the display screen 16, as more fully described below, from reduced life do to exposure to sunlight.

Figure 1:
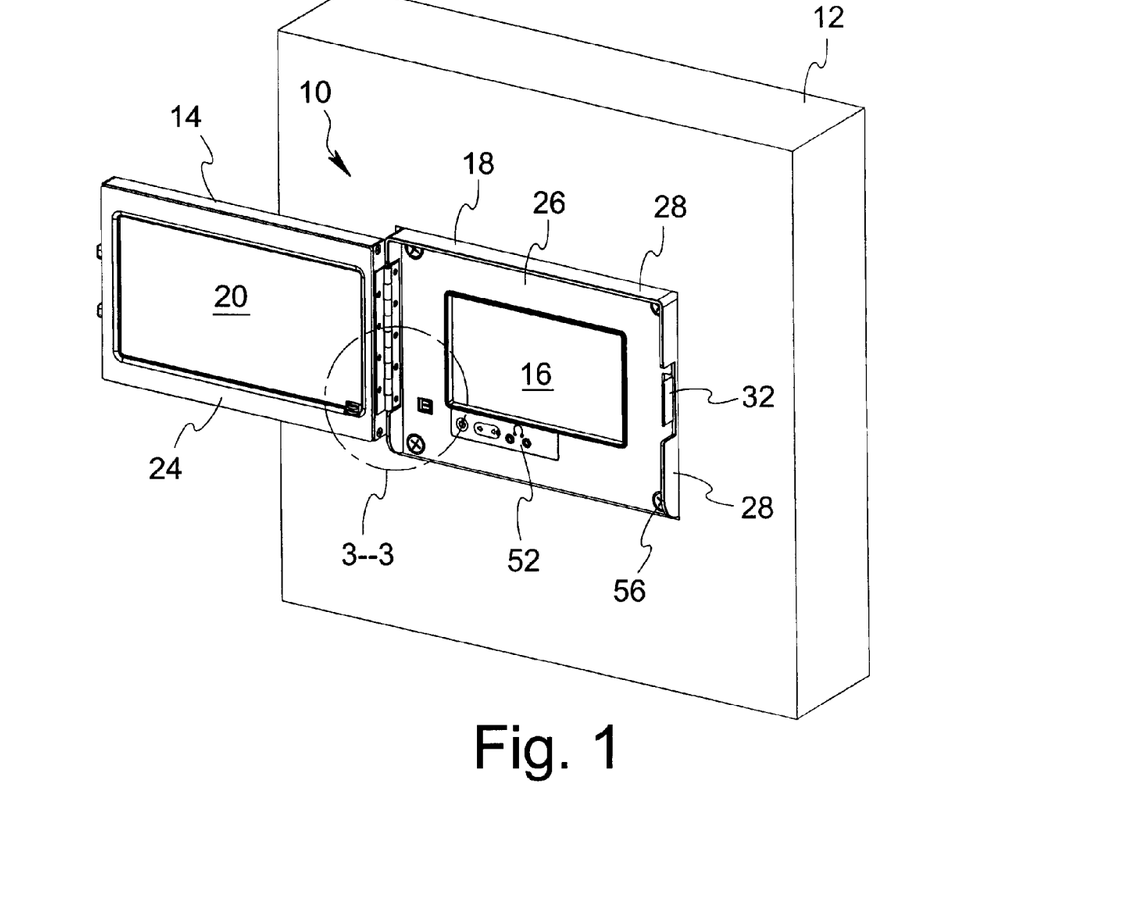
FIG. 1 is an isometric view of a self-contained, gravesite multimedia player with door open, mounted in a grave marker, taken from upper front right, and showing an area 3-3 in a broken circle where the detail view of FIG. 3 is taken.
Figure 2:
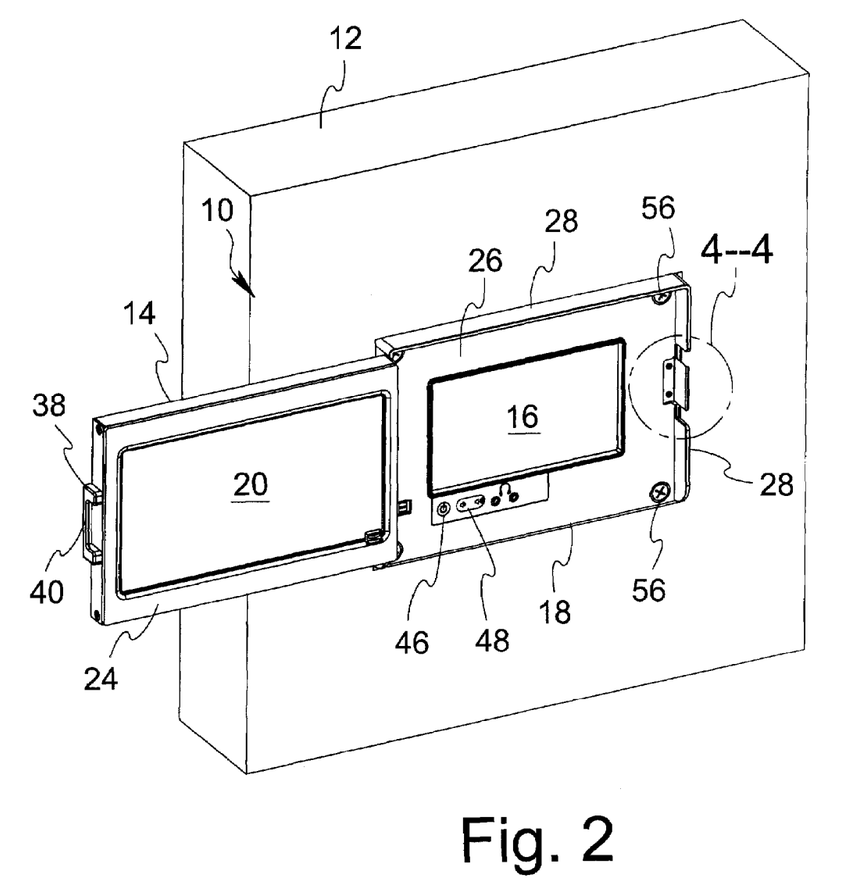
FIG. 2 is an isometric view thereof with door open, taken from upper front left, showing an area in a broken circle 4-4 where the detail view of FIG. 4 is taken.

The main body 18 of the media player includes a peripheral bezel or cover plate 26, best shown in FIGS. 1 and 2, that cooperates with the solar panel and first weather seal when the door is closed. Door seal 24 engages the face of the cover plate 26 near its periphery. The cover plate 26 is configured as a frame that extends around a central opening that allows viewing of the central display screen 16 when the door is open.

A peripheral shield wall 28 extends forward from the cover plate 26 about the top and opposite side edges of the cover plate 26, forming a three-sided weather shield carried to the front of the display screen 16. The peripheral wall 28 extends forward for a distance equal to the approximate thickness of the solar panel 14 and is sized and arranged to allow the solar panel to be received between the three sides of the shield. One of the side spans of the shield wall carries the hinge 22. The opposite side span of the shield wall carries a latch 30, described below.

The shield wall 28 protects the front seal 24 from solar exposure and degradation, while permitting bottom side drainage. In addition, the shield wall is a second front seal, complimentary to the first front seal. The shield wall cooperates with the solar panel, cover plate, and first seal to create a peripheral labyrinth. It may be appreciated that in addition to being complimentary to the first seal, the shield wall is a surrogate seal to the first seal, in the event the effectiveness of the first seal should decline with age. In particular, a labyrinth is an effective means to exclude direct sunlight.

A releasable latch 30 holds the solar panel in closed position within the shield wall. As best shown in the detail view of FIG. 4, one portion of the latch is a spring plate 32 that is mounted at a cutout 34 in the latch side of the shield wall, opposite the hinge side of the shield wall. The forward edge 36 of the spring plate 32 is curled toward the outside of the shield wall to define a spring catch.

Figure 4:
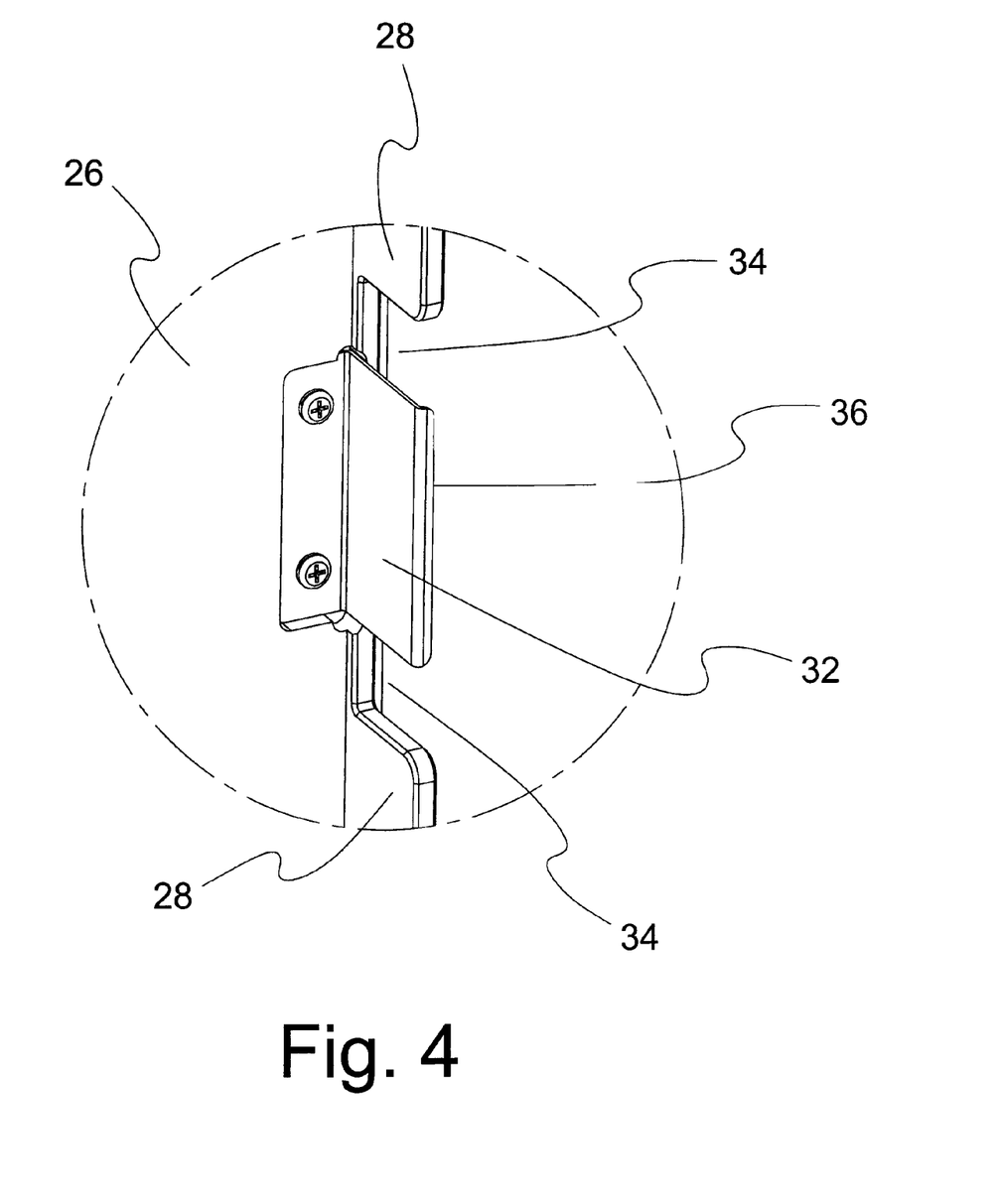
FIG. 4 is a detail view thereof taken at the broken circle 4-4 of FIG. 2.

The solar panel carries an outer or handle portion 38 of the latch 30 in a position to mate with the spring plate 32 when the solar panel is closed. In addition, the handle portion 38 is configured to close the cutout 34. Curled edge 36 engages a latch bar 40 within the handle portion 38 to secure the solar panel in closed position. The handle portion 38 provides a ready handgrip for opening the solar panel 14 when desired. The spring latch provides an audible snap when the latch is reengaged to confirm that the door has been reclosed. Thus, when the door is reclosed after a use of the multimedia player, the integrity of the shield wall is restored.

Figure 3:
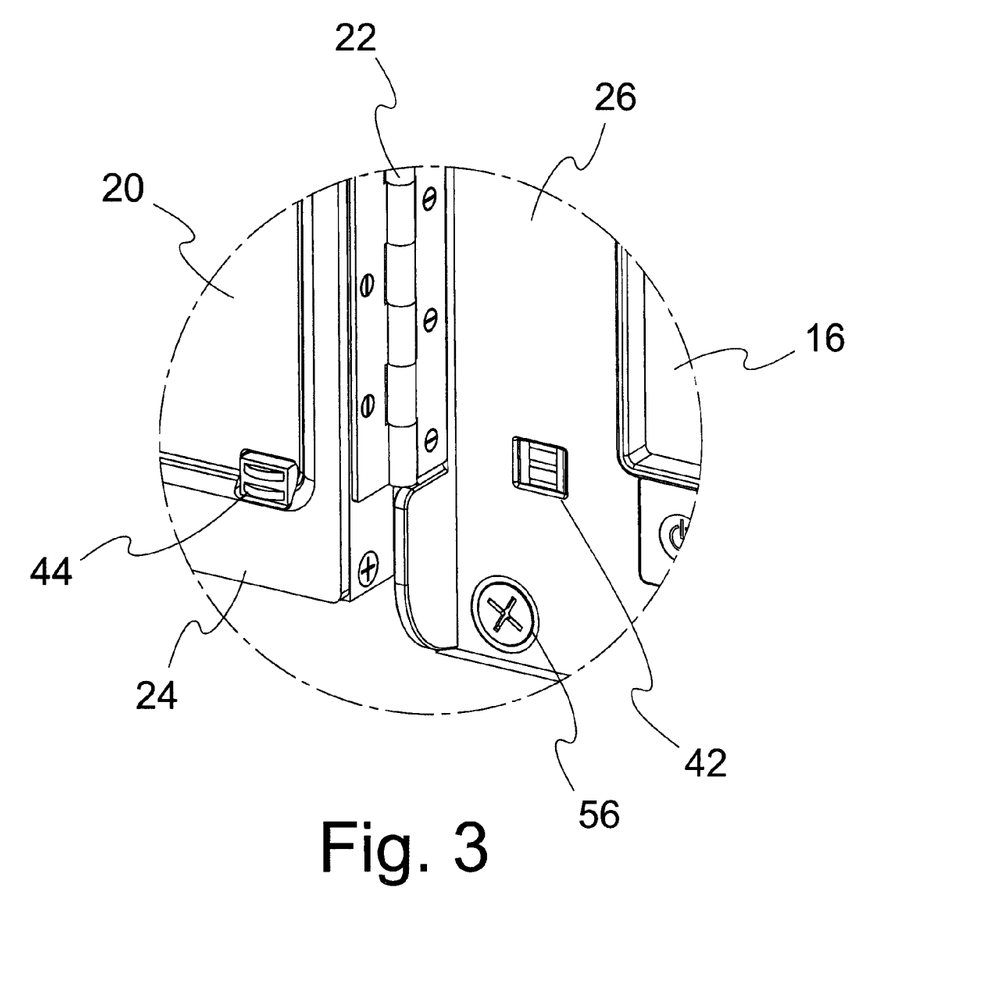
FIG. 3 is a detail view thereof taken at the broken circle 3-3 of FIG. 1.

As best shown in the detail view of FIG. 3, the solar panel 14 is electrically connected to the main body 18 of the multimedia player 10 by a wireless interface formed of aligned contacts. A first pair of contacts 42 may be mounted in the main body 18 and a second pair of contacts 44 may be mounted to the door in electrical connection with the solar panel. The two pairs of contacts may be referred to as male and female contacts, and the hinge 22 is a means to align the contacts for interconnection when the solar panel 14 is closed over the cover plate 26. The main body 18 houses a suitable rechargeable battery to operate the media player. The contacts 42 are in operative connection to the rechargeable battery to recharge it from the solar panel.

The wireless interface between the solar panel 14 and main body 18 avoids problems of wear, aging and degeneration of exposed, flexed wires or the wire coverings. Eliminating the problems of degenerated wires increases the durability of the multimedia player 10 serving in an outdoor environment over a prolonged period of time.

The interconnection between the solar panel and rechargeable battery is broken when the door panel 14 is opened. This disconnection allows the battery to operate the multimedia player to play the stored data in accordance with the electrical specifications of the battery, itself. A preferred type of battery is a rechargeable lithium ion battery operating at 12 volts DC, 1 amp. The solar panel is automatically taken off-line whenever the door is open. Therefore, the solar panel can be selected to meet optimal recharging characteristics for the battery.

One edge of the cover plate, such as the edge below the screen 16, carries a set of interfaces and controls, including a combined "on" and "play" button 46, a pair of selection controls such as sound up/down adjustment controls 48 and a pair of earphone jacks 52. While the multimedia player optionally may include a speaker or other sound reproduction device, the earphone jacks 52 offer the advantage of allowing the tribute to be viewed without openly broadcasting the audio portion of the tribute.

Figure 5:
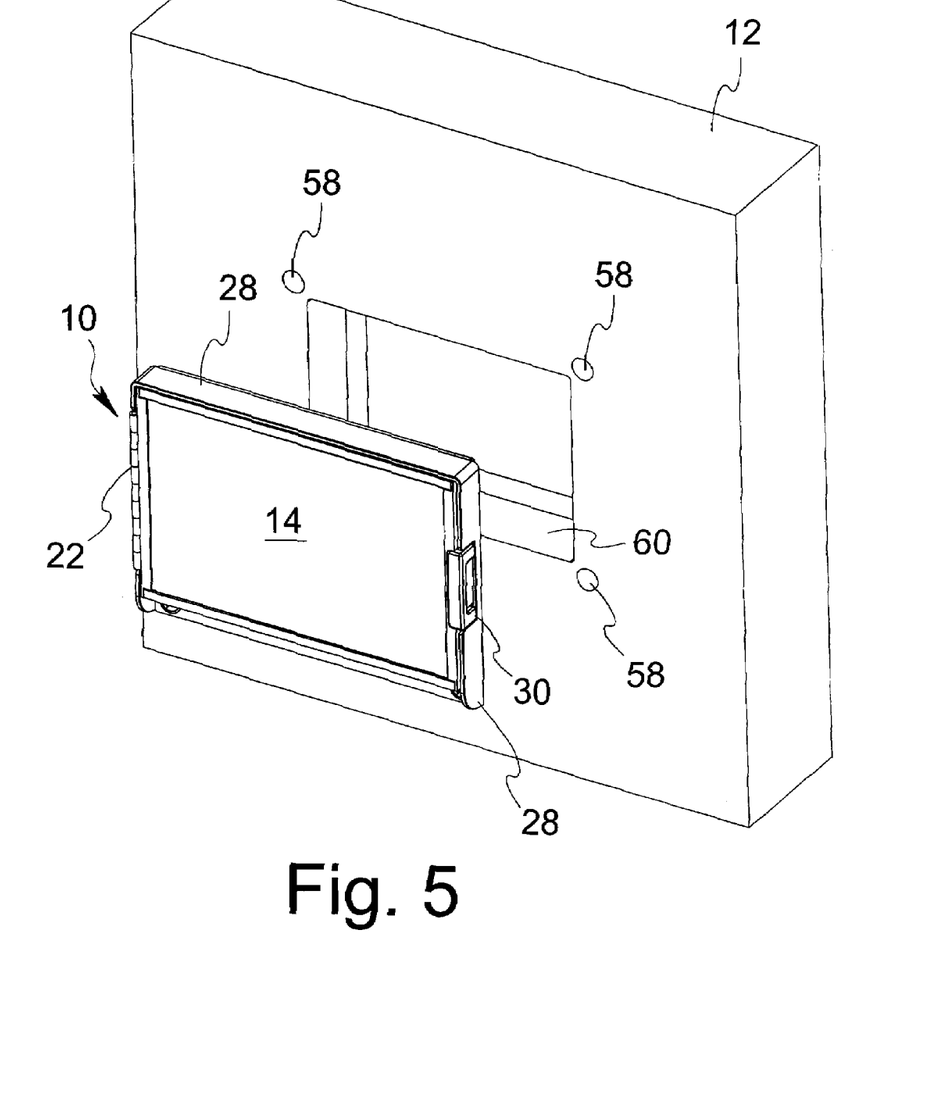
FIG. 5 is an isometric assembly view thereof with door closed, with grave marker configured to receive the multimedia player, taken from the upper front right.
Figure 6:
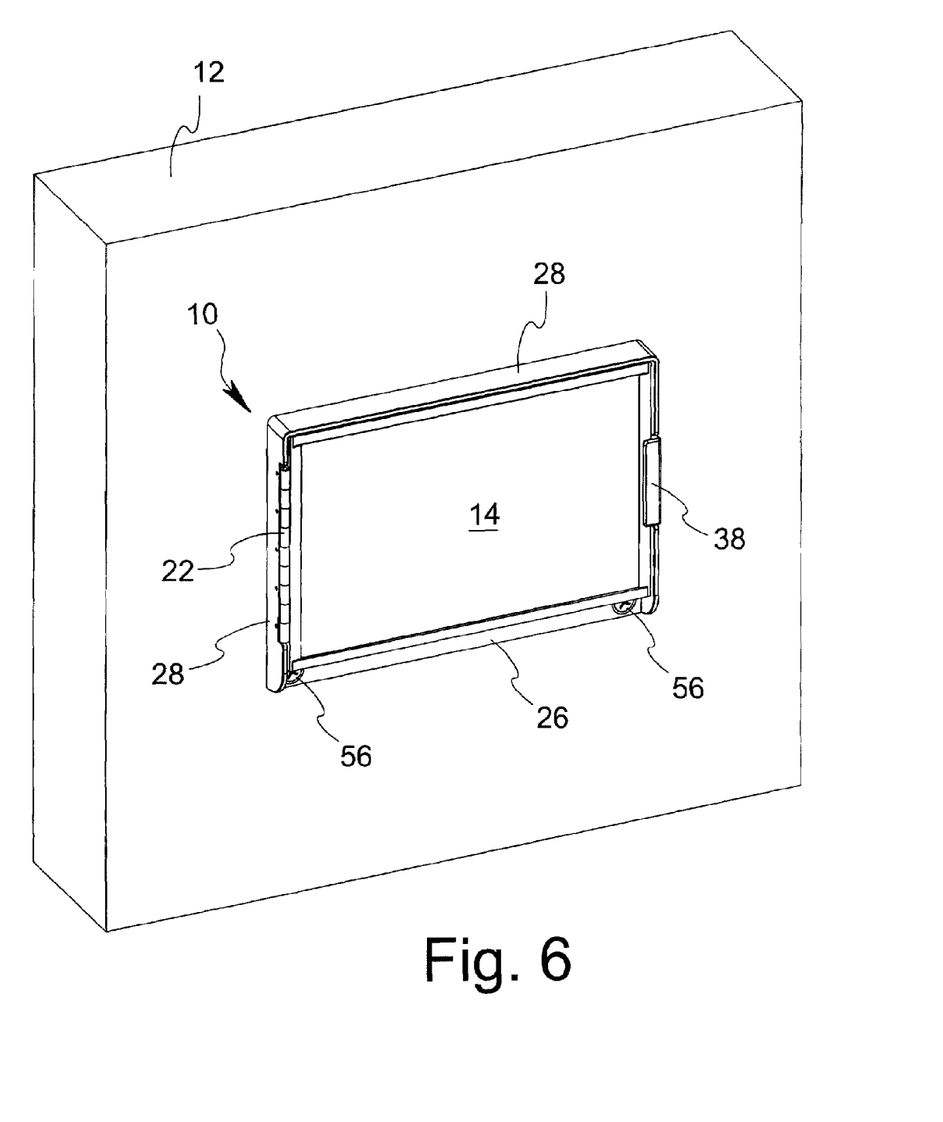
FIG. 6 is an isometric view thereof with door closed, mounted in a grave marker, taken from upper front left.

The cover plate can be mounted to the face of the grave marker 12. Removable fasteners 56 pass through the cover plate and into the marker 12 such as into mounting locations 58 best shown in FIG. 5. The fasteners may be security fasteners that are not readily removed without a special tool. FIG. 5 also shows that a shelf 60 may be cut into the grave marker to receive a rear portion of the multimedia player 10. The multimedia player 10 can be installed on the grave marker with its rear portion resting on this shelf 60 to minimize the effects of gravity over time on the fasteners 56.

The preferred display screen 16 is a liquid crystal diode panel, often referred to herein as an LCD panel. The LCD panel is a color display panel. Various preferred specifications of the LCD panel are given here, by way of example and not limitation: the LCD panel and may have viewable size of about seven inches, which is approximately equal to the central opening in the cover plate 26; the LCD panel may be of the type known as an active matrix TFT LCD; resolution can be 1140×234; brightness can be 300 cd/m$^2$; contrast can be 150:1; horizontal viewing angle can be 170°; and vertical viewing angle can be 50°. The cover plate 26 borders the LCD panel.

As explained above, exposure to sunlight is known to damage and prematurely degenerate an LCD panel. The double duty placement of the solar panel over the screen not only restricts sunlight from reaching the screen, but also mounts and displays the solar panel to receive sunlight. Supporting the solar panel 14 from the main body 18 of the media player solves additional problems. One such problem is in working with stone materials. Remotely mounting the solar panel from the media player can produce difficulties in creating an electrical connection between the solar panel and a battery or electronic components within the media player. Various proposals to extend connecting cables through a granite memorial encounter substantial difficulty because forming small bores through granite tends to be impractical.

An electronics module 62 is operatively connected to the screen 16 for displaying images of the tribute on the screen. The electronics module is attached to the rear of the cover plate 26 by suitable fastening means as suggested in FIG. 7-9. The module 62 houses known electronic devices that read a memory card, display images on screen 16, and sending audio signals to headphone jacks 52. The module houses one or more memory cards in communication with the memory card reading devices.

Known components of the electronics module 62 include a memory card reader. The preferred reader will be able to support some or all of the following formats: CF—Compact- Flash™ Card type I/type II; SM—SmartMedia™ Card; MS—Memory Stick and Memory Stick Pro; SD—SECURE DIGITAL CARD; and MMC—MULTIMEDIA CARD. The multimedia player 10, which also may be referred to as a memory card player, supports one or more types of memory cards. Thus, the player 10 is equipped with one or more suitable slots or interfaces for receiving at least one preselected type of memory card.

Optionally, "on" button 46 engages an auto start mode that provides an auto slide show in a preselected format, such as MPEG4 format, without requiring resort to a main menu. Upon conclusion of a playing the multimedia show, an auto-sensing switch immediately may shut off the multimedia player to avoid needless battery drain.

Figure 7:
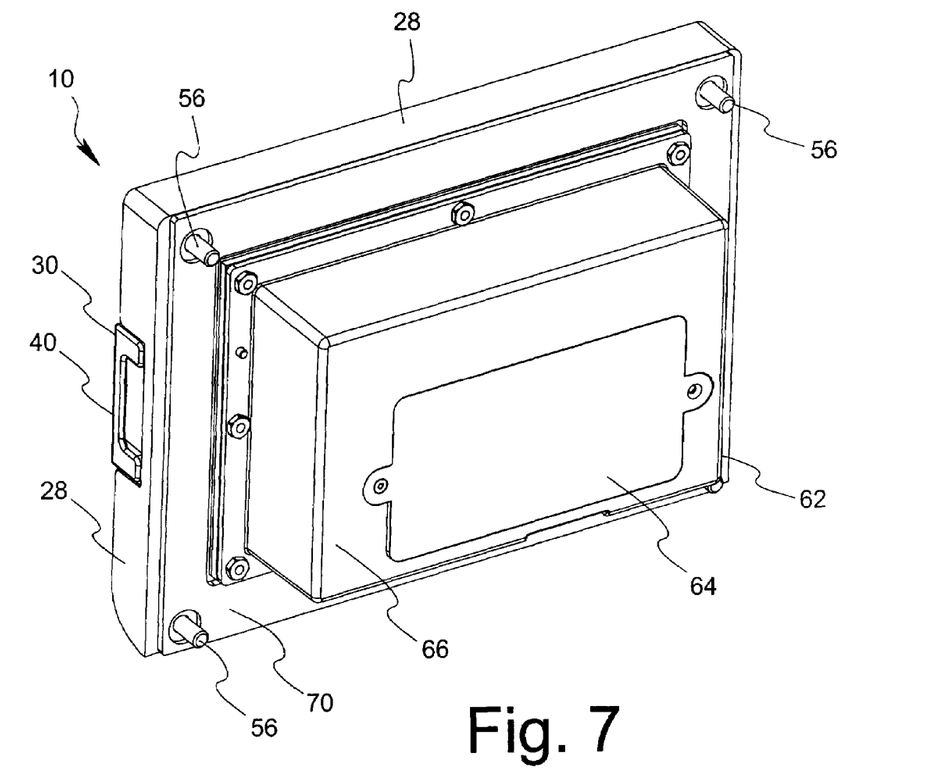
FIG. 7 is an isometric view thereof with door closed, taken from upper rear left.
Figure 8:
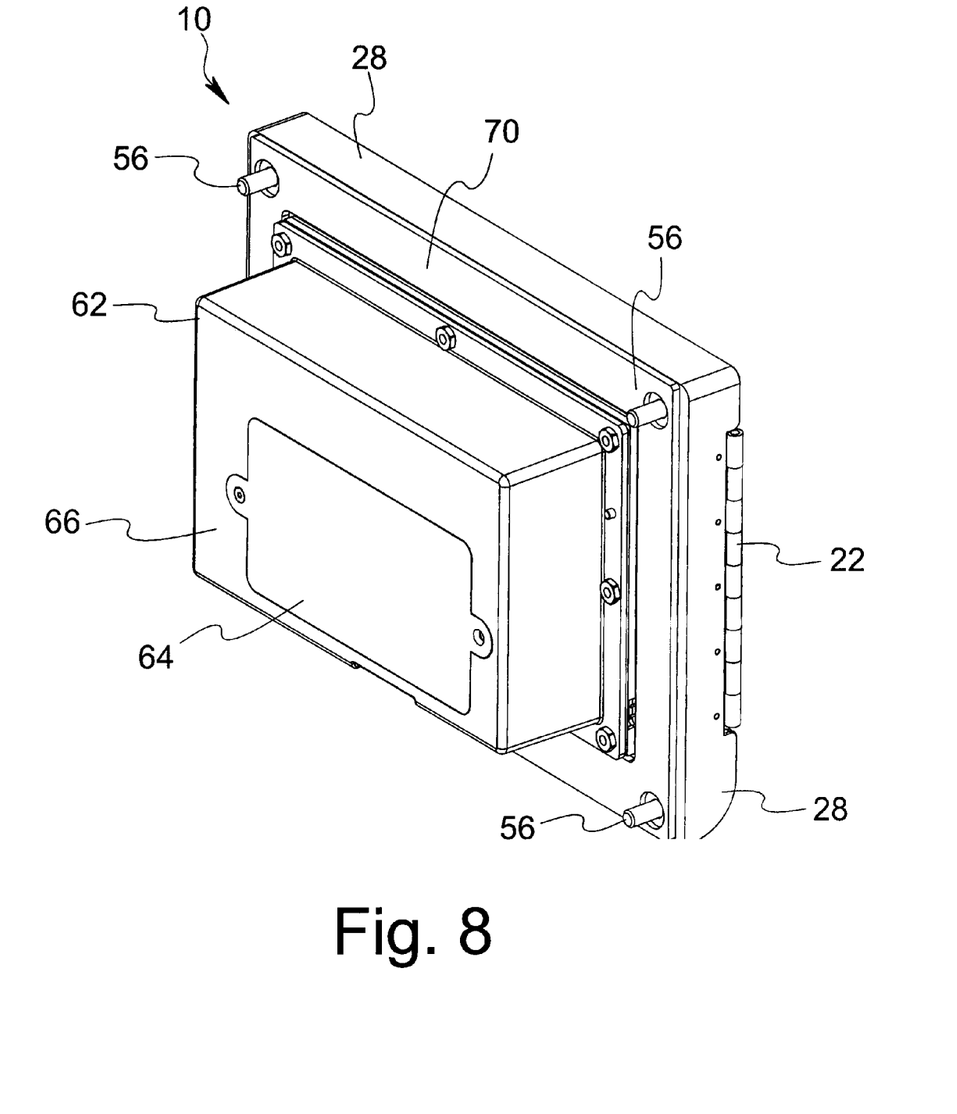
FIG. 8 is an isometric view thereof with door closed, taken from upper rear right.
Figure 9:
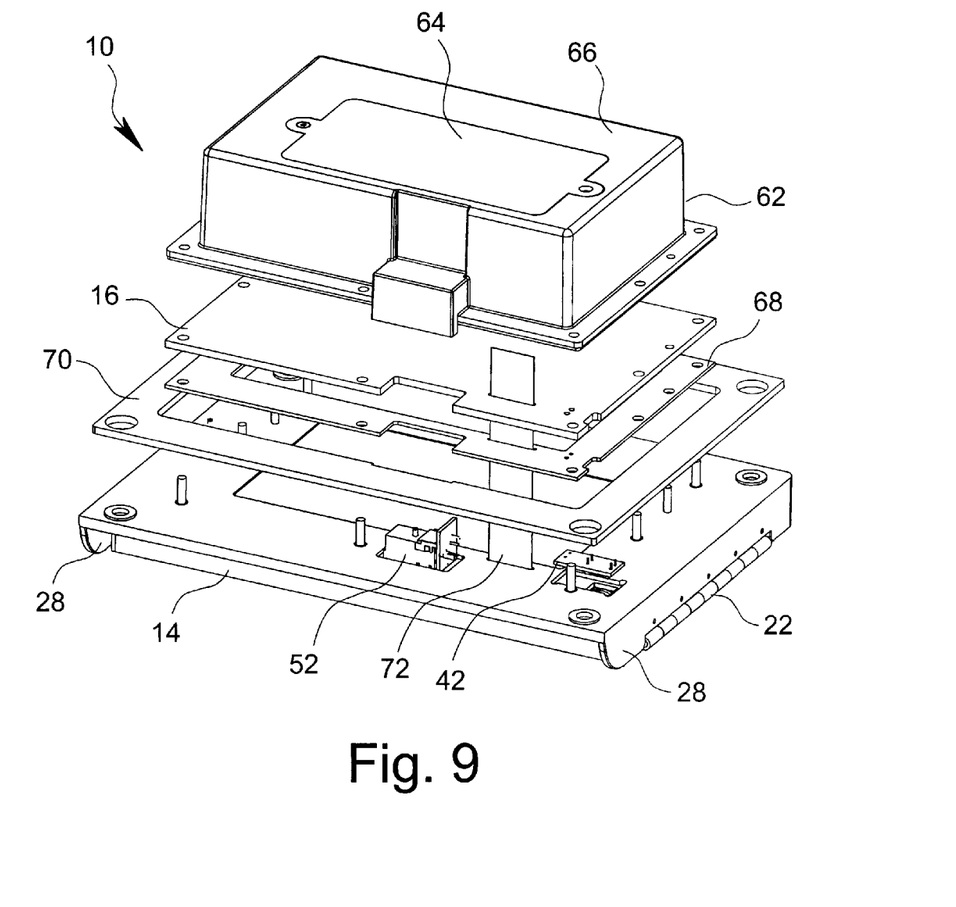
FIG. 9 is an isometric assembly view thereof with door closed, taken from lower rear right.

The described electronic components within the electronics module 62, including the battery, are known commercial equipment or equivalent in function to known equipment. The electronics module 62 of FIG. 7-9 represents in black box form the presence and preferred location of electronic components and rechargeable battery of such an available device. A battery door 64 of the electronics module provides access for removal or replacement of the battery, as may be required.

The assembly view of FIG. 9 provides additional detail of the main body 18 of the multimedia player. The electronics module is closed by a rear electronics housing 66. The screen 16 is located at the front face of the housing 66 and is UV resistant. The screen front is polycarbonate that is coated for anti-glare properties and for scratch resistance. In front of the screen 16 and behind the bezel 26 is a polycarbonate screen gasket 68. On the backside of the bezel 26 and outside the electronics housing 66 is a bezel to stone mounting gasket 70. The view of FIG. 9 also shows backside elements of the earphone jacks 52 and wireless contacts 42. This view also schematically indicates a flat cable 70 for interconnections of components within the electronics module.

According to a method of use, the multimedia player 10 will display a tribute to a decedent. The player 10 is to be installed on a gravesite monument or tombstone by qualified professionals for viewing by the decedent's family and friends. The preferred player 10 consists of components including an LCD monitor and an audio output jack. Further, a solid-state memory card is readable to provide the audio and video data of the tribute for display on the screen and for audio output to the jack. The memory card may be of a type known as CF—CompactFlash™ Card type I/type II; SM—SmartMedia™ Card; MS—Memory Stick and Memory Stick Pro; SD—secure digital card; and MMC—multimedia card. A memory card player supports the format of the memory card, reads the memory card, and outputs video and audio information to the screen and audio output source. A rechargeable lithium ion battery powers the electronic components. A solar panel serves as a recharge system for the battery and serves as a door that, when shut, covers the display screen to protect it from direct sunlight. A first seal or resilient rubber gasket protects the screen from natural elements. A second seal protects the first seal and protects the screen from exposure. Control buttons operate functions of the electronic components (On/Play/Up-Down Volume). The headphone jack provides an interface to receive an audio headphone.

Each digitized tribute will range from 5 to 7 minutes in length and will be composed of several photographs, video clips or meaningful symbols according to the customer's preference. Each tribute will be produced by digitizing each photograph and developing a tribute in slideshow format utilizing specialized software to add music, variation and special effects. The resulting tribute will then be stored on one of the aforementioned memory cards, to be played by the memory card player.

Each tribute will be categorized and stored as a electronic backup file according to several pieces of information including customer name and location, serial number of the multimedia player, date of sale, date of production, warranty expiration, and warranty coverage. A backup copy will always be available to the customer in case it is needed for reproduction on DVD or other format.

The multimedia player 10 can display digital photos by the LCD screen, without operation of a computer or printer. The multimedia player features simple operation by actuating the "on" button 46, whereupon the multimedia player will display a show of the contents of a memory card in a memory card reader within the electronics module 62. The use of a memory card to store the show allows for the show to be amended by removing, reprogramming, and replacing the memory card.

Optionally, the memory card may carry two or more shows, such as shows memorializing two or more persons.

Optionally, the electronics module may provide two or more memory card interfaces, such that more than one memory card can be interfaced. This expanded capability may be used as necessary to store longer tributes than possible with available memory cards and tributes to more than one person. Software may provide a main selection menu to allow the viewer to pick which tribute he desires to review.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. In a self-contained multimedia player suited for attachment to a grave marker and suited for playing a predefined audio and video presentation relating to a decedent, the self-contained multimedia player comprising: a housing carrying a memory device storing said predefined presentation; a multimedia player means in operative communication with said memory device for reading the memory device and playing the presentation; a display screen carried on a front face of the housing in operative communication with the multimedia player means for receiving and displaying a video portion of the presentation;

in combination, a rechargeable battery in electrical communication with the multimedia player for operating the player to play the presentation, and a solar panel external of the housing, connectable through the housing to said rechargeable battery for supplying current to recharge the battery, and means pivotally mounting said solar panel to the housing at a first lateral edge of the solar panel for selected movement between a closed position wherein a back side of the solar panel overlies said display screen for protecting the display screen from exposure to light while displaying an active front face of the solar panel for receiving light to generate electricity, and an open position uncovering the display screen and thereby permitting viewing the screen;

a resilient seal carried by said back face of the solar panel in position sealing against the housing and protecting the display screen when the solar panel is in said closed position; a first pair of contacts mounted on the front face of the housing; a second pair of contacts mounted on the backside of the solar panel, wherein when the solar panel is in the closed position the first and second pair of contacts align and electrically connect the solar panel to the rechargeable battery and the multimedia player is disabled from playing said presentation; and a latch having a first latch portion carried by the housing and a second latch portion carried by the solar panel at a second lateral edge thereof opposite from said first lateral edge of said solar panel, wherein the first and second latch portions are suitably positioned to mate when the solar panel is moved to the closed position, to secure the solar panel in the closed position with respect to the housing.

2. The multimedia player of claim 1, wherein said housing further comprises:

a system of first and second complimentary seals for protecting said display screen, wherein said first seal is said resilient seal, and said second seal is a peripheral shield wall extending forward from the position of said display screen at the periphery of said solar panel when in closed position to protect both the first seal and the display screen.

3. The multimedia player of claim 1, wherein said housing further comprises:

a shield wall peripheral to said resilient seal, extending forward from the position of said display screen and juxtaposed to the periphery of said solar panel in closed position;

wherein said shield wall includes at least a top edge wall and a pair of opposed side edge walls with an open bottom portion, wherein one of said pair said side edge walls is juxtaposed to said first latch portion, and wherein said top and side edge walls provide, in combination with said housing and the solar panel in closed position, a labyrinth seal at top and side edges of the display screen for protecting both the display screen and the resilient seal and permitting bottom drainage;

the shield wall is configured to define a cutout area in said side edge wall juxtaposed to said first latch portion; and said second latch portion is configured and positioned to substantially close said cutout area when the solar panel is in said closed position, maintaining the integrity of the shield wall seal when the solar panel is latched in the closed position.

4. The multimedia player of claim 1, wherein said self-contained multimedia player means comprises:

said first contacts located on said housing and said second contacts located on said solar panel, said first and second contacts being positioned such that they are out of electrical communication when said solar panel is in said open position; and further comprising:

means for maintaining said solar panel and housing in alignment for bringing said first and second contacts into electrical communication with the solar panel is moved to said closed position.

\* \* \* \* \*